United States Patent [19]

Koizumi

[11] Patent Number: 4,711,034

[45] Date of Patent: Dec. 8, 1987

[54] ELECTRONIC MEASURING DEVICE

[75] Inventor: Hiroshi Koizumi, Kawasaki, Japan

[73] Assignee: Mitutoyo Mfg. Co., Ltd., Tokyo, Japan

[21] Appl. No.: 929,042

[22] Filed: Nov. 12, 1986

[30] Foreign Application Priority Data

Nov. 13, 1985 [JP] Japan ............................ 60-254292
Nov. 15, 1985 [JP] Japan ............................ 60-256205
Nov. 15, 1985 [JP] Japan ............................ 60-256206

[51] Int. Cl.$^4$ ............................................. G01B 3/22
[52] U.S. Cl. ................................................ 33/172 E
[58] Field of Search ............ 33/172 E, 143 L, 147 N, 33/148 H, 125 A, 125 C; 377/24, 17; 340/688, 691; 116/230, 232, 233, 284; 308/220, 228, 229

[56] References Cited

U.S. PATENT DOCUMENTS 4,289,382 9/1981 Clark ............................ 33/172 E X
4,290,131 9/1981 Kume ............................ 368/228 X
4,505,042 3/1985 Nishina ............................ 33/172 E

FOREIGN PATENT DOCUMENTS 0080025  4/1983 Fed. Rep. of Germany .
1346012  2/1974 United Kingdom .
1453423 10/1976 United Kingdom .
2107046  4/1983 United Kingdom .

Primary Examiner—Harry N. Haroian
Attorney, Agent, or Firm—Flynn, Thiel, Boutell & Tanis

[57] ABSTRACT

An electronic measuring device capable of indicating a measured value in both analog and digital forms. In this device, the displacement of a spindle is converted into a number of pulses and counted by a counter, and the number of pulses thereby obtained is thereafter indicated by an indicator. On the other hand, a pulse motor disposed in a pointer rotating unit is driven by a driving circuit in accordance with a counted value supplied from the counter so as to rotate a pointer by an angle corresponding to the counted value.

8 Claims, 7 Drawing Figures

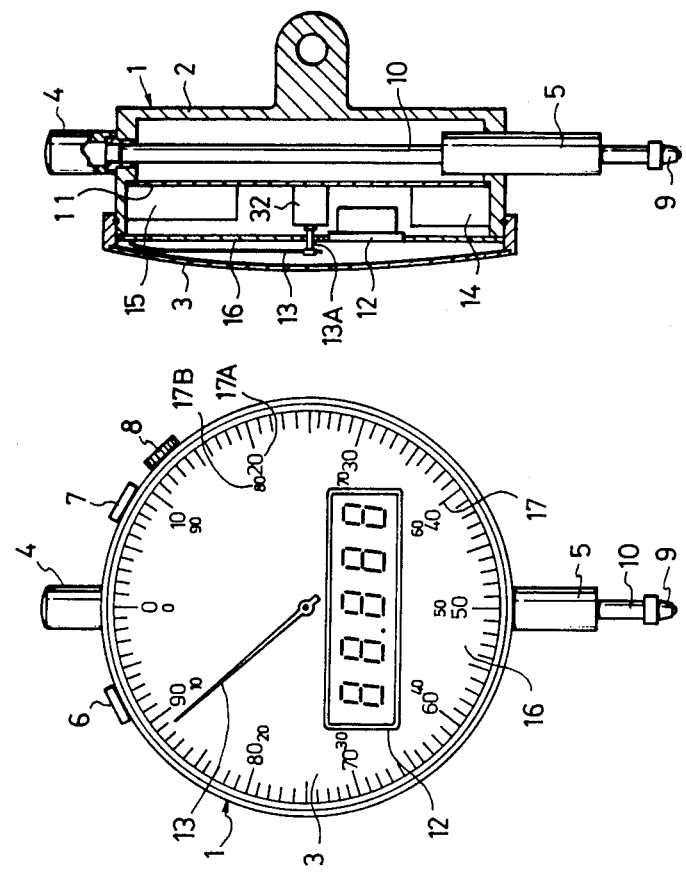

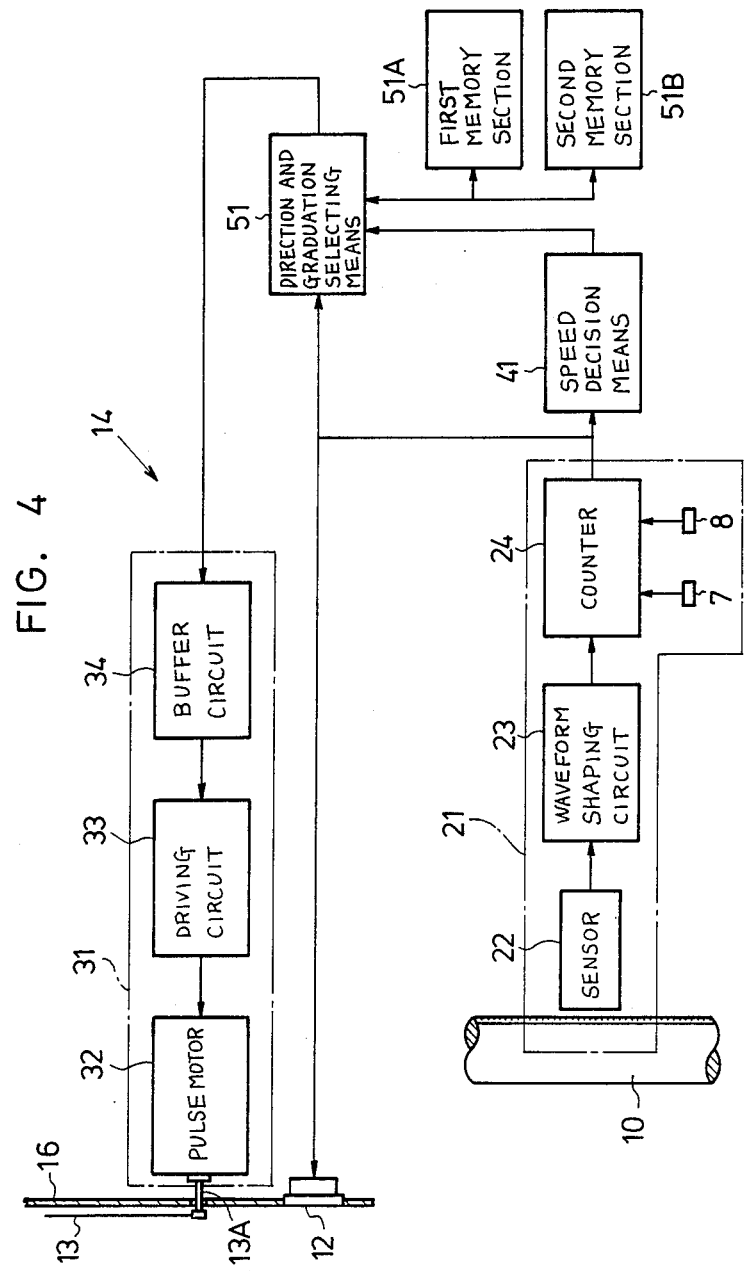

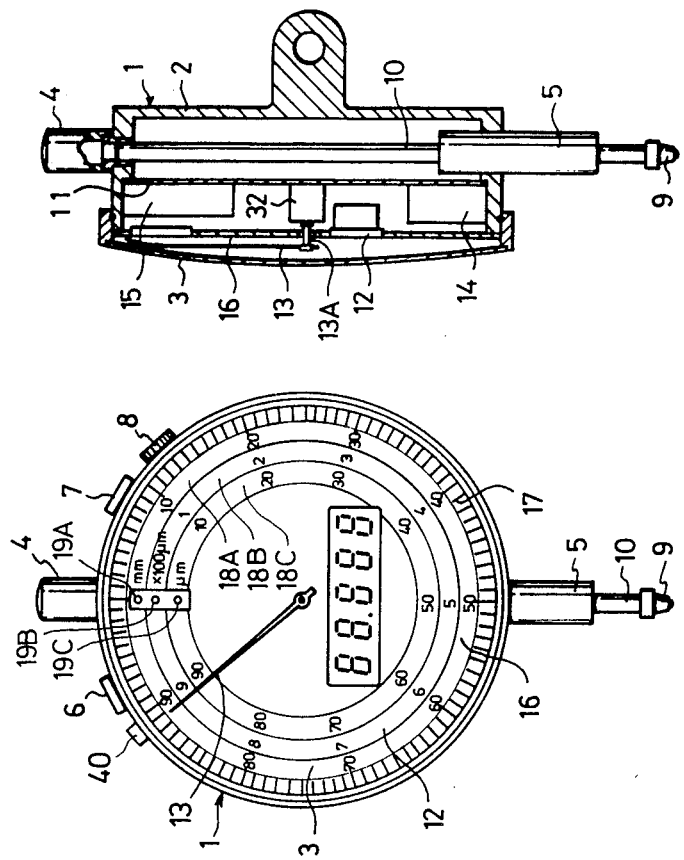

ELECTRONIC MEASURING DEVICE

BACKGROUND OF THE INVENTION

1. Field of the Invention

This invention relates to an electronic measuring device capable of indicating a measured value in the form of both analogue and digital displays.

2. Description of the Prior Art

So-called mechanical analogue gauges of the type in which the linear movement of a spindle is converted into the rotational movement of a pointer through the medium of a motion conversion mechanism formed by a rack, pinion, etc., and/or an enlarging mechanism formed by gears including a sector gear and in which the pointer indicates a graduation on a scale to be read as a measured value have been traditionally used in various fields.

Lately, so-called electronic dial gauges such as the sort which incorporates in the main body an encoder operated in accordance with the movement of a spindle and which indicates a measured value obtained by the encoder in a digital display effected by a digital indicator are being used increasingly.

In general, these electronic dial gauges, which are disadvantageous in economic terms, are adopted for the reason that they have properties of high resolution and high accuracy and are easy-to-read, while mechanical dial gauges are adopted in consideration of their capability to operate without any power source as well as their easy-to-use properties, when the degree of accuracy required is not more than their rated accuracy. Also the latter type are more likely to be adopted in circumstances where it is necessary to determine for acceptance or rejection whether articles being measured fall within a predetermined range of value.

However, in practice, it is not possible to carry out measurement by employing only one of these two types of devices, because the kind of object to be measured, the mode of measurement, and matters of skill and tradition or the like must be considered. Thus, it has been generally necessary to provide both types.

When one of these types of device is employed for measurement, it is often found that the characteristic of the other type is required. For instance, in the case of a mechanical dial gauge which is employed in order to decide, for acceptance or rejection, whether articles fall within a certain range, it is often desirable to know by what amount rejected articles fall short of the predetermined value. On the other hand, in some cases, it is not always necessary to constantly read a digital display which changes every moment as it may be sufficient simply to judge the intermediate tendency thereof.

This situation may result in the idea of combination of the two different types, but it is difficult for an arrangement which consists solely of a simple combination to define a desirable relationship between the values read from different types of displays. Such a simple combination would merely complicate the structure and increase the cost.

In particular, when the graduations of an analogue display are designed to correspond to the minimum place unit of the digital display, the pointer must make several tens or hundreds of turns. If a spindle stroke of 100 μm is assumed to correspond to one revolution of the pointer, the pointer makes a hundred revolutions for a spindle stroke of 10 mm. Such a large number of revolutions is a burden on the mechanism of the pointer and it may damage the same.

If the device is designed to allow both the read values to correspond to each other, it is possible to read it on the digital display with a high resolution over a wide range and it is not difficult on the analogue display. For this reason, the device is so arranged that the range which can be read by means of the graduations and the pointer corresponds to two or three places on the digital display. However, it is impossible for this arrangement to indicate a value in the analogue form with respect to objects to be measured which are outside the range readable with the graduations and the pointer.

SUMMARY OF THE INVENTION

Therefore, an object of the present invention is to solve the problems of combining the above-described two conventional types and to provide an electronic measuring device which has the properties of both conventional types and is capable of greatly improving the efficiency of the measurement process and of indicating a measured value with high resolutions over a wide range even in the analogue form.

To this end, the present invention provides a measuring device which is fundamentally of the electronic type and which has no motion conversion mechanism nor enlarging mechanism, but which has graduations and a pointer so as to exhibit the properties of both conventional types of measuring device.

More specifically, the measuring device in accordance with the present invention comprises: a spindle slidably disposed in the axial direction in the main body and having at its top a probe; a counter device having a sensor whose elements are disposed on the main body and on the spindle in corresponding positions and are adapted for converting relative displacement therebetween into an electrical signal or signals, the counter device operating to count the number of pulses in the electrical signal supplied from the sensor, these pulses corresponding to the relative displacement; a digital indicator for indicating a measured value in a digital form on the basis of the counted value supplied from the counter device; a pointer rotating means having a pulse motor and a driving circuit, a pointer rotating means operating to rotatingly drive a pointer on the basis of the counted value supplied from the counter device; and a scale for enabling the measured value to be read by cooperating with the pointer, the measured value thereby being read from the outside of the main body by means of the pointer and the scale, and the digital indicator.

BRIEF DESCRIPTION OF THE DRAWINGS

FIG. 1 is a front view of an electronic dial gauge which is a first embodiment of the present invention;

FIG. 2 is a cross-sectional view of FIG. 1;

FIG. 4 is a circuit block diagram of a second embodiment;

FIG. 5 is a front view of a third embodiment;

FIG. 6 is a cross-sectional view of FIG. 5; and

DETAILED DESCRIPTION OF THE PREFERRED EMBODIMENTS

Figure 3:
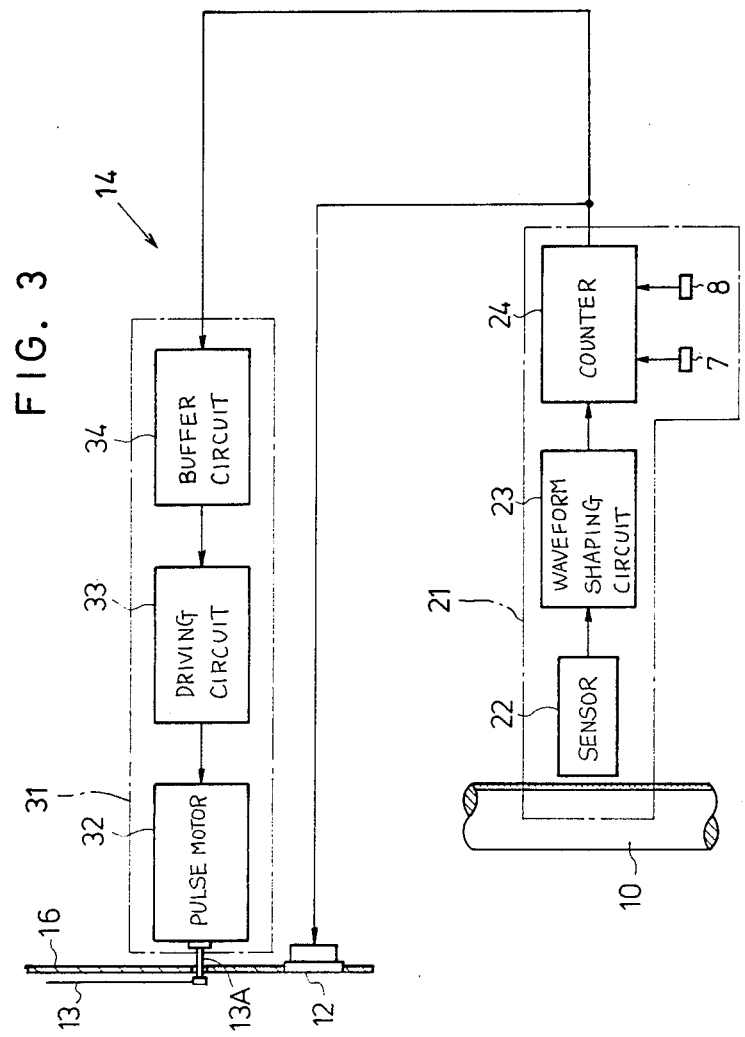
FIG. 3 is a circuit block diagram of the first embodiment.

FIG. 1 shows the front view of an electronic dial gauge which is a first embodiment of the present invention, and FIG. 2 is a cross sectional view of the same. As shown in these figures, a main body 1 is formed by a cylindrical case 2 which is open at its one end, and a cover 3 made of transparent material and fitted to the end of the case 2.

A spindle protection cylinder 4 and a stem 5 which are axially aligned with each other are respectively attached to the outer peripheral wall of the case 2 at upper and lower portions thereof. A power switch 6 is disposed in the outer peripheral wall of the case 2 on the left hand side of the spindle protection cylinder 4, and a resetting switch 7 and a presetting switch 8 are also disposed in the wall on the right hand side of the spindle protection cylinder 4. A spindle 10 having at its lower end a probe 9 is inserted into the spindle protection cylinder 4 and the stem 5 while being constantly urged downwardly by a spring or the like (not shown) so that it extends from the spindle protection cylinder through the stem 5 and is slidable in the axial direction thereof.

A circuit board 11 is accommodated in the case 2 so that it is disposed parallel with the axis of the spindle 10. An electric circuit 14 and a battery 15 are provided on the circuit board 11. The electric circuit 14 detects the relative displacement between the main body 1 and the spindle 10 in the form of an electric signal and processes the same in a predetermined manner so as to make a digital indicator 12 indicate the relative displacement, and the circuit 14 simultaneously operates to rotate a pointer 13 in accordance with the electrical signal. The battery 15 supplies the electric circuit 14 with electric power when the power switch 6 is turned on. The digital indicator 12 has a five-place display which indicates at its minimum place a unit of 1/1000 mm (1 $\mu$m), and each place formed by a seven-segment element.

A scale plate 16 in the form of a disk is inserted between the case 2 and the cover 3. The scale plate 16 has at its outer edge graduations 17 which cooperate with the pointer 13 so as to enable a measured value to be read. The display surface of the indicator 12 is exposed in the surface of the scale plate 16. Thus, a measured value can be read from the pointer 13 and the graduations 17 and from the digital display 12, which are seen through the outer surface of the main body 1, namely, the cover 3. The periphery of the scale plate 16 is equally divided into 100 graduations corresponding to the upper two places from the minimum place of the digital indicator 12, thus forming the graduations 17, whereby measured values within a range of 1 $\mu$m to 99 $\mu$m can be read. The graduations 17 have numerical values 17A and 17B such as 0, 10, 20, 30 ... which are given every 10 graduations in the normal rotational direction of the pointer 13 (e.g., clockwise direction) and in the reverse direction.

The above-described electric circuit 14 includes, as shown in FIG. 3, a counter device 21 which converts the relative displacement between the spindle 10 and the main body 1 into an electric signal, counts the number of pulses in this electric signal corresponding to the relative displacement, and thereafter supplies the digital indicator 12 with the counted value. The circuit 14 also includes a pointer rotating means 31 for rotatingly driving the above-described pointer 13 in accordance with the counted value supplied from the counter device 21.

The counter device 21 is constituted by a sensor 22 for detecting the relative displacement between the spindle 10 and the main body 1 in the form of sine and cosine waves, a waveform shaping circuit 23 for discriminating the electric signal supplied from the sensor 22 with respect to the direction of the relative movement and converting the same into pulses having a predetermined unitary length of, in this arrangement, 1 $\mu$m/1 pulse, and a counter 24 for counting the pulses supplied from this waveform shaping circuit 23. The sensor 22 may be constituted by a main scale which is secured to the outer peripheral surface of the spindle 10 such as to be parallel with the axis thereof and which has an optical grating disposed along the same axis, an index scale which is disposed on the main body 1 so as to face the main scale and which has a similar optical grating, and light emitting and light receiving elements secured to the main body 1, the light emitting elements being adapted for irradiating the above scales. The waveform shaping circuit 23 may also have, if necessary, a divider circuit for converting sine and cosine waves into pulses of a predetermined unitary length. The counter 24 is constituted by an up-down counter which operates to count up when supplied with a pulse by an upward movement of the spindle 10 as viewed in FIG. 1 and which operates to count down when supplied with a pulse by a downward movement. The counter 24 is also arranged such that the counted value is reset to 0 when the resetting switch 7 is turned on and that an optional value can be preset by the presetting switch 8.

The pointer rotating means 31 includes a pulse motor 32 which is connected to the pointer shaft 13A of the pointer 13 and which moves in a step-by-step manner by a predetermined step angle in accordance with the excitation phase change-over operation, a driving circuit 33 which successively changes the excitation phase of the pulse motor 32 each time it is supplied with a pulse which issues in accordance with the resetting process of the counter 24, thereby making the pulse motor 32 steppingly move by the predetermined step angle, and a buffer circuit 34 for controlling the pulse supply rate of the pulses supplied to the driving circuit 33 in accordance with the speed of the counted value resetting process of the counter 24. The driving circuit 33 is designed to make the pulse motor 32 steppingly move by successively changing the excitation phase of the pulse motor each time it is supplied with a pulse. Specifically, in this arrangement, the pulse motor 32 rotates by an angle of 360°/100 (3.6°), namely, the angle corresponding to each interval of the graduations 17.

The functions of this embodiment will be described below. When the spindle 10 is displaced, both scales are relatively moved so that the sensor 22 of the counter device 21 puts out sine and cosine waves. These signals are converted by the waveform shaping circuit 23 into a pulse signal of 1 $\mu$m/1 pulse, and pulses in this signal is counted by the counter 24. Counted values thus put out by the counter 24, namely, the relative displacement between the spindle 10 and the main body 1 are successively indicated by the digital indicator 12.

Simultaneously, the counter 24 puts out a pulse each time a counted value is reset in the counter 24. This pulse is supplied to the driving circuit 33 by way of the buffer circuit 34 of the pointer rotating means 31. Then the driving circuit 33 operates to successively change the excitation phase of the pulse motor 32 so as to make the motor steppingly move by the unitary step angle.

The pointer 13 is thereby rotated by one graduation at a time to a position on the graduations 17 corresponding to a counted value. If the counter 24 effects the counted value resetting process at a high speed, the buffer circuit 34 carries out timing adjustment of the pulse supply rate of pulses supplied to the driving circuit 33, thereby ensuring that the pointer 13 accurately rotates by angles defined by the pulse number corresponding to the counted value supplied from the counter 24, even when the relative displacement between the spindle and the main body 1 occurs at a high speed so as to increase the counted value resetting speed of the counter 24. It is thereby possible to equalize a read value read from the digital indicator 12 and another read value read from the pointer 13 and the graduations 17 on the scale plate 16 with each other.

On the other hand, when the reset switch 7 is pressed after the probe 9 of the spindle 10 is brought into contact with a reference surface, a counted value in the counter 24 and an indicated value in the digital indicator 12 are reset to 0 so that the size measured from the reference surface is thereafter indicated as a measured value. When, in this state, an optional value is preset in the digital indicator 12 by the preset switch 8, the size which is the sum of the value of the amount of movement of the spindle 10 and the preset value is thereafter indicated.

As described above with respect to the embodiment, the present invention provides both merits of the mechanical and electronic types of measuring devices. While the spindle 10 is moving, it is possible to observe measured values in the analogue form instead of reading digital display figures which are reset and changed rapidly. Thus, the device in accordance with the present invention can reduce the labor of measuring work and enable the final desired value to be read in the digital form with high accuracy. Also, it is possible to carry out measuring work speedily and easily when it is desirable to know by what amount the rejected articles fall short of the predetermined value or when it is sufficient simply to judge the tendency in the intermediate state of the measuring process.

Since the pointer 13 is driven by the pulse motor 32, there is no need for the provision of mechanical parts such as a conventional motion conversion mechanism or enlarging mechanism. Therefore, it is possible to prevent errors due to backlashes, etc. and to simplify the structure, hence, reduce the size of the measuring device.

The pulse motor 32 is driven in accordance with the result of the count effected by the counter device 21 which is indicated by the digital indicator 12, and the values read from the pointer and the scale plate 16 are not tentative values but true values. It is thereby possible to perform measurement with high accuracy by reading these values only. Moreover, they are equal to those indicated by the digital indicator 12 so that they are readily confirmed. The buffer circuit 34 for regulating the pulse supply rate of pulse supply to the driving circuit 33 is provided. It is thereby possible to operate the pulse motor 32 positively and accurately even when the spindle 10 moves at a high-speed and the speed of the resetting process effected by the counter device 21 is so high that the driving circuit 33 and the pulse motor 32 cannot follow this process.

In addition, since the measuring device in accordance with the present invention is provided with the digital indicator 12, the scale plate 16 and the pointer, it is possible for the user to optionally select the measurement modes in accordance with circumstances.

Next, a second embodiment of the present invention will be described with reference to FIG. 4. In this arrangement, constituents which are the same as or equivalent to those of the first embodiment have the same reference numerals, and the description for such constituents are omitted or simplified.

The second embodiment further includes a speed decision means 41 which detects that the pause of the counted value resetting process of the counter device 21, namely, the pause of the movement of the spindle 10 is longer than a predetermined time and which puts out the detection signal indicating such a paused state, and a direction and graduation selecting means 51 which determines the minimum rotational angle and the rotational direction of the pointer 13 to the graduation point corresponding to a counted value given by the counter device 21 by employing the counted value and the mode of the graduation 17 in accordance with the detection signal supplied from the speed decision means 41. This measuring device rotatingly drives the pointer 13 in accordance with the instruction of the determined rotational angle and the rotational direction made by the direction and graduation selecting means 51.

The direction and graduation selections means 51 has a first memory section 51A for memorizing a counted value (the present position of the pointer 13) supplied from the counter 24 in accordance with the detection signal from the speed decision means 41, and a second memory section 51B for memorizing a counted value corresponding to one revolution of the pointer 13. The direction and graduation selecting means 51 receives a counted value from the counter 24; finds the difference between this value and that memorized in the first memory section 51A (the total amount of revolution of the pointer 13); finds the remainder of a division process of dividing this difference value by a counted value memorized in the second memory section 51B (the amount of revolution of the pointer 13 not more than one revolution); and judges whether or not this remainder is less than one half of the counted value memorized in the second memory 51B, namely, a half revolution of the pointer 13. If the remainder is not more than one half, the means 51 assumes the normal direction and, if the remainder is more than one half, it assumes the reverse direction. The means 51 sends these rotational direction instructions to the pointer rotating means 31 while suppling this means 31 with a number of pulses corresponding to the above remainder in the case of the normal direction and with a number of pulses corresponding to the difference between this remainder and the counted value memorized in the second memory section 51B. The means 51 thereafter resets the counted value in the first memory section 51A when supplied with a new counted value from the counter 24 and maintains this as a value representing the present position of the pointer 13.

In the second embodiment thus arranged, when the counted value resetting speed of the counter 24 becomes less than a predetermined level or when in this arrangement it becomes zero, the speed decision means 41 detects this state and puts out the detection signal to the direction and graduation selecting means 51. The direction and graduation selecting means 51 receives a counted value from the counter 24, finds the difference between this value and that memorized in the first memory section 51A, finds the remainder of a division process of dividing this difference value by a counted value memorized in the second memory section 51B; and judges whether or not this remainder is less than one half of the counted value memorized in the second memory 51B. If the remainder is not more than one half, the means 51 assumes the normal direction and, if the remainder is more than one half, it assumes the reverse direction. The means 51 sends these rotational direction instructions to the pointer rotating means 31 while suppling this means 31 with a number of pulses corresponding to the above remainder in the case of the normal direction and with a number of pulses corresponding to the difference between this remainder and the counted value memorized in the second memory section 51B.

The rotational direction instruction and the pulses are supplied to the driving circuit 33 by way of the buffer circuit 34 of the pointer rotating means 31, and the driving circuit 33 successively changes the excitation phase of the pulse motor 32 to make this motor steppingly move by one unitary step angle each time the circuit is supplied with one pulse. The pointer 13 is rotated by an angle corresponding to each interval of the graduations 17 at a time to a graduation point corresponding to the counted value through a shortest way. Other functions are similar to those in the case of the first embodiment.

Thus, in the second embodiment, the pointer 13 is rotated to a position on the graduations 17 corresponding to the counted value through a shortest way, thereby enabling the number of the revolution of the pointer 13 to be minimized no matter how the displacement of the spindle 10 may be. It is thereby possible to prevent any damage of the measuring device and to rapidly indicate the final value.

Figure 7:
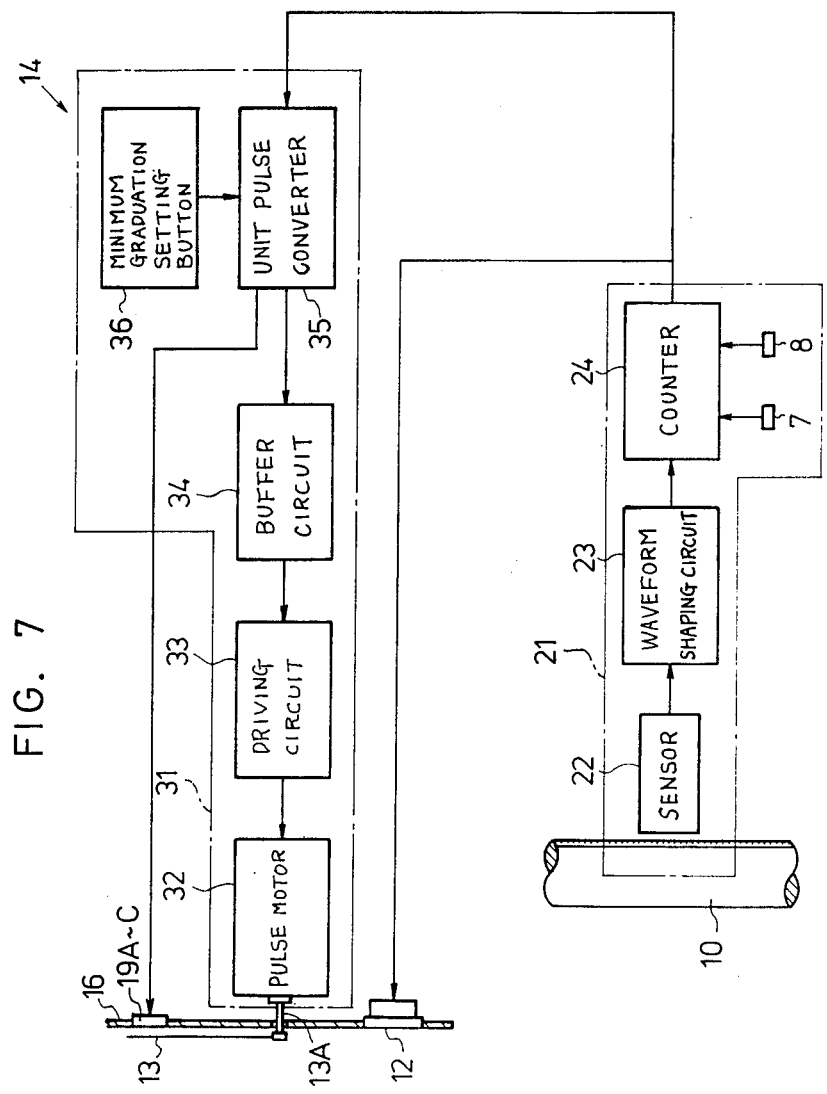
FIG. 7 is a circuit block diagram of the third embodiment.

A third embodiment of the present invention will be described below with reference to FIGS. 5 to 7. In this arrangement, constituents which are the same as or equivalent to those of the above-described embodiment have the same reference numerals, and the description for such constituents are omitted or simplified.

The third embodiment relates to an improvement in the resolution of reading over a wide range through the medium of the analogue indication scale and the pointer.

In the arrangement shown in FIGS. 5 and 6, a minimum graduation setting button 40 is placed on the left hand side of the power switch 6 which is disposed on the left hand side of the spindle protection cylinder 4. The graduations 17 are provided with three numeral sections 18A to 18C which are different in the minimum resolution and with discrimination lamps 19A to 19C as discrimination marks corresponding to the numeral sections 18A to 18C and functioning to discriminating these sections. The numeral section 18A is provided with numerals indicating 10 mm, 20 mm, ... which are disposed every 10 graduations so as to correspond to the upper two places of the digital indicator 12. The numeral section 18B is provided with numerals indicating $1 \times 100$ μm, $2 \times 100$ μm, ... which are disposed every 10 graduations so as to correspond to two places lower than the decimal point on the indicator 12, namely, unitary values of 1/10 and 1/100 mm. The numeral section 18C is provided with numerals indicating 10 μm, 20 μm, ... which are disposed every 10 graduations so as to correspond to the lower two places of the digital indicator 12.

The pointer rotating means 31 is provided with a unit pulse converter 35 for effecting the pulse number conversion of pulses supplied from the counter 24 and thereafter puts out processed pulses to the driving circuit 33 by way of the buffer circuit 34. This unit pulse converter 35 carries out the pulse number conversion of the input pulses with respect to one of the numeral sections 18A to 18C selected by the minimum graduation setting button 40, and it lights up one of the discrimination lamps 19A to 19C which corresponds to the selected one of the numeral sections 18A to 18C. In this arrangement, the dividing ratio of each of the other sections 18B and 18C is changed on the basis of that of the numeral section 18A. That is, the pulse converter 35 puts out one pulse each time it is supplied with one pulse with respect to the section 18A; puts out one pulse each time it is supplied with 10 pulses with respect to the section 18B; and puts out one pulse each time it is supplied with 1000 pulses with respect to the section 18C. Accordingly, if the pulse converter 35 is assumed to have 1000 input pulses, it puts out 1000 pulses and so as to rotate the pointer 13 to an extent corresponding to 1000 graduations (10 revolutions) when the numeral section 18A is selected; it puts out 100 pulses so as to rotate the pointer 13 to an extent corresponding to 100 graduations (one revolution) when the numeral section 18B is selected; and it puts out one pulse so as to rotate the pointer 13 to an extent corresponding to one graduation when the numeral section 18C is selected.

In the third embodiment thus arranged, one of the numeral sections 18A to 18C is first selected by means of the minimum graduation setting button 40. When the numeral section 18B, for instance, is selected, the unit pulse converter 35 lights up the discrimination lamp 19B which corresponds to the section 18B.

As the spindle is moved, the counter 24 puts out pulses each time the counted value in the counter 24 is reset, and these pulses are supplied to the unit pulse converter 35 of the pointer rotating means 31. Since the numeral section 18B has been selected by the minimum graduation setting button 40, the unit pulse converter 35 carries out a corresponding pulse number conversion. That is, the unit pulse converter 35 puts out one pulse to the driving circuit 33 by way of the buffer 34 each time it is supplied with 10 pulses. Then the driving circuit 33 successively changes the excitation phase of the pulse motor 32 each time it is supplied with one pulse, thereby making the pulse motor steppingly move by one unitary step angle at a time. The pointer is thereby moved by one graduation at a time on the graduations 17 to a graduation position corresponding to the counted value. Accordingly, it is possible to obtain the amount of movement of the spindle 10, namely, the measured value from the read value which is read from figures in the numeral section 18B of the graduation 17 indicated by the pointer 13. Other functions are similar to those in the case of the above-described embodiments.

The third embodiment thus arranged is further advantageous as follows. Since it has three numeral sections 18A to 18C different in resolution and the unit pulse converter 35 which effects the input pulse number conversion in accordance with the minimum resolution of selected one of the numeral sections, it is possible to read figures on the digital indicator 12 with high accuracy over a wide range of the entire places thereof by selecting these numeral sections. In addition, the discrimination lamps 19A to 19B prevent the numeral sections to be read from being confused.

In a practical form of the embodiment of the present invention, the counter device, more specifically, the sensor 22 which has been described as a photoelectric type may be replaced with, e.g., an electrostatic or electromagnetic type, or any other type which is at least capable of electrically detecting the relative displacement between the spindle 10 and the main body 1. Also this is not limited to the type of directly detecting the linear displacement of the spindle 10 and may includes a so-called rotary sensor which converts the linear displacement of the spindle 10 into a rotational movement and detects the amount of rotation of the same.

The display figure places of the digital indicator 12 are not limited to five places as described with respect to the above embodiments. In effect, the number thereof should be determined on the basis of the relationship between the stroke of the spindle 10 and the resolution determined by the sensor 22 and the waveform shaping circuit 23 of the counter device 21.

Possible driving methods of the driving circuits 33, other than the driving method of successively changing the excitation phase of the pulse motor 32 every one pulse so as to steppingly move the motor by one unitary step angle at a time, may include a so-called mini-step driving method for carrying out staged control of currents applied to adjacent coils of the pulse motor 32 so as to move the motor by a subdivided unitary step angle. In effect, the step angle of the pulse motor 32 is determined such that the angle corresponding to the interval of the graduations 17 becomes equal to that of one step turn of the pointer 13. Accordingly, it is possible to arrange such that the turning angle of the pointer 13 rotated in accordance with one step angle of the pulse motor 32 is set to correspond to the interval of the graduations 17 by the provision of precision gears interposed between the pulse motor 32 and the pointer shaft 13A.

It is not particularly necessary for the pointer rotating means to have the buffer 34 as described above with respect to the embodiments. However, the provision of the buffer circuit 34 is effective because it ensures that the pulse motor 32 can rotate positively and precisely even when the spindle 10 is moved at a high-speed. It is thereby possible to prevent the measurement from being influenced by the speed of the movement of the spindle 10. Also the arrangement may be such that the pointer 13 is rotated at a stroke when the resetting process of the counter 24 is completed.

The graduations 17 of the scale plate 16 may be, other than the arrangement in the above-described embodiments, such as that consisting of 100 graduations divided equally and representing 100 mm by one revolution of the pointer 13 and that corresponding to optional three places, two places or one place of the digital indicator 12. Also the scale corresponding to one revolution of the pointer 13 may be divided into 50 graduations. The numerical values attached to the graduations 17, which differ by depending upon which places of the digital indicator 12 they correspond to, may be figures consisting 0 to 9 which are placed at large scale marks. The numeral sections which are attached to the graduations 17 are not limited to three types such as described in the third embodiment, and they may be two types or more than four types. The discrimination marks may be some means other than the lamps.

In the above-described embodiments, the battery 15 is incorporated in the main body 1, but the measuring device according to the present invention may be connected to an external power source.

The speed decision means 41 is not limited to the above-described type which makes the direction and graduation selecting means 51 operate under the condition of the pause of the counting operation of the counter 24, and it may be a type which detects an interval of the counting operations longer than a predetermined time, in other words, a speed of the movement of the spindle 10 not higher than a predetermined level, for instance, a low speed assumed immediately before the stopped state so as to start the operation of the direction and graduation selecting means 51. It is also possible to arrange such that the speed of the movement of the spindle 10 is directly detected and the direction and graduation selecting means 51 is operated when the speed thereof becomes less than a predetermined level including zero.

The arrangement of the direction and graduation selecting means 51 is not limited to that provided in the above-described embodiment. Any means is applicable so long as it has the function of ascertaining the difference angle between the present position of the pointer 13 and the graduation point corresponding to the counted value of the counter 24 smaller than the angle corresponding to one revolution and ascertaining the shortest-way rotational direction.

The present invention has been described with respect to dial gauges, but the invention is not limited to this and is generally applicable to any other types of measuring apparatus such as that indicating the amount of relative movement between the spindle 10 and the main body 1 in both digital and analogue forms.

As described above, the present invention can solve the problems of combining the conventional mechanical and electronic types by providing an electronic measuring device which has the properties of both conventional types and is capable of greatly improving the efficiency of the measurement work and of indicating measured values with high resolution over a wide range even in the analogue form.

What is claimed is:

1. An electronic measuring device comprising:
   a spindle slidably disposed in the axial direction in the main body and having at its tip a probe;
   couter means having a sensor whose elements are disposed on said main body and on said spindle in corresponding positions and are adapted for converting relative displacement therebetween into an electrical signal, said counter means operating to count the number of pulses in said electrical signal supplied from the sensor, said pulses corresponding to said relative displacement;
   a digital indicator for indicating a measured value in a digital form on the basis of said counted value supplied from said counter device;
   pointer rotating means including a pulse motor and a driving circuit for rotatingly driving a pointer on the basis of said counted value supplied from said counter device to said driving circuit, said pointer rotating means further including a buffer circuit for controlling the rate of supplying pulses to said driving circuit; and
   a scale for enabling said measured value to be read by cooperating with said pointer, said measured value thereby being read from the outside of said main body by means of said pointer and said scale, and said digital indicator.

2. An electronic measuring device according to claim 1, wherein said scale includes several types of numeral sections different in resolution, and discrimination marks for indicating one of said numeral sections to be read, and wherein said pointer rotating means further includes a unit pulse converter for effecting pulse number conversion of input pulses in accordance with one of said numeral sections previously selected to be read and for selecting one of said discrimination marks which corresponds to said previously selected numeral section, thereby enabling measured value to be read with different degrees of minimum resolution from said scale and said pointer.

3. An electronic measuring device according to claim 2, wherein said numeral sections includes three types.

4. An electronic measuring device according to claim 2, wherein said discrimination marks include lamps.

5. An electronic measuring device according to claim 1, said electronic measuring device being a dial gauge.

6. An electronic measuring device comprising:

a spindle slidably disposed in the axial direction in the main body and having at its tip a probe;

coutner means having a sensor whose elements are disposed on said main body and on said spindle in corresponding positions and are adapted for converting relative displacement therebetween into an electrical siganl, said counter means operating to count the number of pulses in said electrical signal supplied from the sensor, said pulses corresponding to said relative displacement;

a digital indicator for indicating a measured value in a digital form on the basis of said counted value supplied from said counter device;

pointer rotating means including a pulse motor and a driving circuit for rotatingly driving a pointer on the basis of said counted value supplied from said counter device to said driving circuit;

a scale for enabling said measured value to be read by cooperating with said pointer, said measured value thereby being read from the outside of said main body by means of said pointer and said scale, and said digital indicator; and speed decision means for judging the travel speed of said spindle to be lower than a predetermined level including zero, and direction and graduation selecting means for determining the shortest-way rotational angle and the rotational direction of said pointer to a graduation point corresponding to said counted value of said counter means, on the basis of said counted value and the mode of said scale under the condition of the output signal supply of said speed decision means, and for putting out the items of information on said direction and said angle to said pointer rotating means, thereby effecting shortest-way rotation of said pointer.

7. An electronic measuring device according to claim 6, wherein said pointer rotating means further includes a buffer circuit for controlling the rate of supplying pulses to said driving circuit.

8. An electronics measuring device according to claim 6, said direction and graduation selecting means has a first memory section for memorizing the initial position of said pointer, and a second memory section for memorizing a counted value corresponding to one revolution of said pointer.

* * * * *